A. EBERLE.
HORSE ATTACHING AND DETACHING APPARATUS.

No. 180,013. Patented July 18, 1876.

Witnesses:

Inventor:
August Eberle
By his Attorney

UNITED STATES PATENT OFFICE.

AUGUST EBERLE, OF HAMILTON, OHIO.

IMPROVEMENT IN HORSE ATTACHING AND DETACHING APPARATUS.

Specification forming part of Letters Patent No. 180,013, dated July 18, 1876; application filed April 20, 1876.

*To all whom it may concern:*

Be it known that I, AUGUST EBERLE, of Hamilton, in the county of Butler and State of Ohio, have invented a new and useful Improvement in Fastenings for Attaching and Detaching Horses to and from Carriages; and I do hereby declare that the following is a full, clear, and exact description thereof, reference being had to the accompanying drawings, and to the letters of reference marked thereon.

Figure 1:
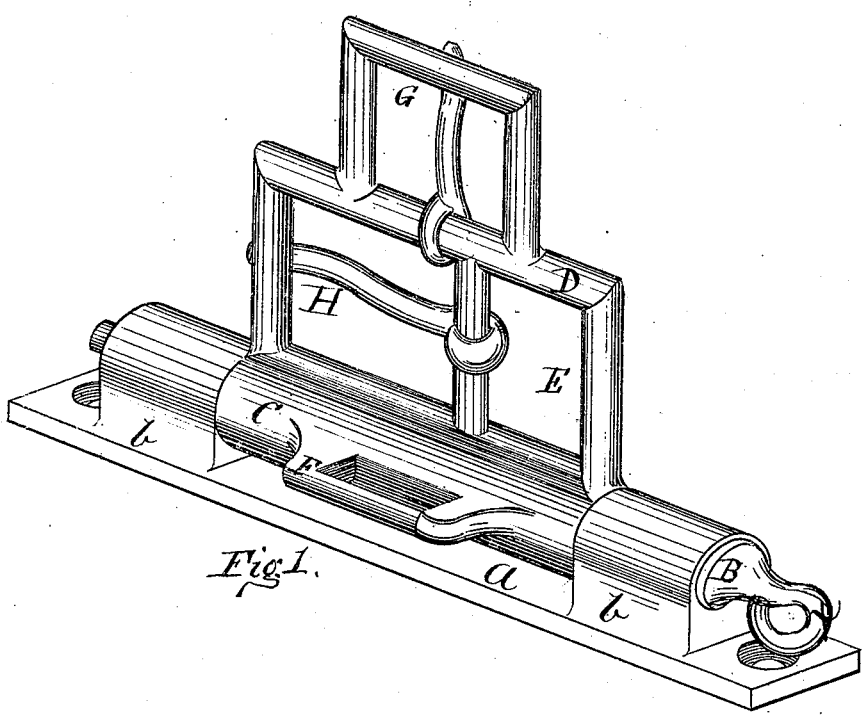
Figure 2:
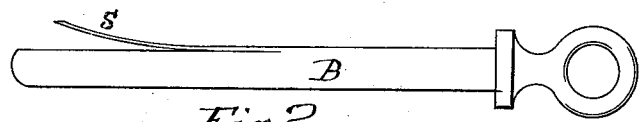
Figure 3:
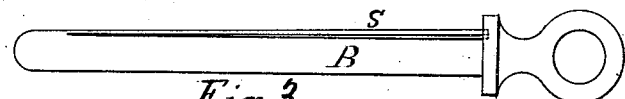

Figure 1 represents a perspective view of my new fastening. Figs. 2 and 3 represent the spring-bolt for attaching and detaching the fastening.

My invention consists of a shaft-plate provided with lugs, in combination with a sleeve and buckle-frame, provided with tongues and loops, to be connected and disconnected by a spring-bolt, as hereinafter described.

The plate $a$ is to be secured by screws to the shafts of a carriage, and the lugs $b$, which are cast or otherwise constructed as a part of plate $a$, have longitudinal holes through them to receive the connecting-bolt B, which also passes through sleeve C, to hold the parts together, as represented in Fig. 1.

The shaft-plate $a$, with its lugs $b$, may be made of malleable iron or other metal, as one piece, and the sleeve C, with the frame D, may also be cast as a single piece. Each may be made of wrought metal, and finished in any ornamental manner.

The frame D has upon it the loop E, into which the breeching-strap of the harness is to be fastened, and the loop F upon the sleeve C is for the attachment of the belly-band.

Buckle G is to secure the back-strap connected with the saddle of the harness, and buckle H is for securing the tug or trace of the harness, which completes the harness-connections, with the fastening. These parts of the harness may be permanently secured to the frame D, as specified.

The fastening, as represented in Fig. 1, is designed for the right-hand side of the harness or carriage, and consequently the loop F is upon the inner side. This loop is so placed in relation to plate $a$ that it will serve as a stop to prevent the frame D from bearing unduly against and chafing the side of the horse.

The arrangement is such that when the harness is adjusted to the horse and connected with the shaft-plate $a$ by bolt B, loop F rests against the shaft-plate, with the thickness of the belly-band between them, which serves as a cushion, and thereby the tendency to oscillate and rattle is obviated.

The left-side fastening will be constructed like that shown in Fig. 1, excepting that the loop F and the buckle-tongues will be attached upon the opposite side of the fastening.

The springs connected to the bolt B may be attached, as represented in either Fig. 2 or 3, or in any suitable manner to retain the bolt in place by sufficient pressure.

When this improved fastening is in use, a cord passing from the driver's seat, or from the front of the carriage, through guides or tubes along the shafts, will be connected with the rings $x$ at the rear ends of bolts B, so that the bolts B may be readily and quickly drawn out, when the shafts of the carriage will fall to the ground, and the horse will become detached from the vehicle.

This improved fastening cheapens the construction of both the harness and the carriage, by dispensing with long traces, and with a single-tree, and is efficient and durable; besides, it affords the quickest and most reliable means for detaching runaway horses from carriages.

Having described my invention, I claim as an improvement in fastenings for attaching and detaching horses to and from vehicles—

1. The sleeve C, with its loops and buckles E F G H, in combination with the shaft-plate $a$ and spring-bolt B, substantially as and for the purpose described.

2. The arrangement of the loop F on sleeve C, in the relation to plate $a$, substantially as and for the purpose specified.

Witness my hand this 3d day of April, A. D. 1876.

AUGUST EBERLE.

Witnesses:
H. P. K. PECK,
WILLIAM MILLER.